(12) United States Patent
Takahashi et al.

(10) Patent No.: US 12,431,753 B2
(45) Date of Patent: Sep. 30, 2025

(54) ROTATING ELECTRIC MACHINE AND METHOD FOR MANUFACTURING ROTATING ELECTRIC MACHINE

(71) Applicant: HITACHI ASTEMO, LTD., Hitachinaka (JP)

(72) Inventors: Akeshi Takahashi, Tokyo (JP); Kenichi Nakayama, Hitachinaka (JP); Tetsuya Suto, Tokyo (JP); Keisuke Takeuchi, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 372 days.

(21) Appl. No.: 18/008,247

(22) PCT Filed: May 28, 2021

(86) PCT No.: PCT/JP2021/020342
§ 371 (c)(1),
(2) Date: Dec. 5, 2022

(87) PCT Pub. No.: WO2022/018967
PCT Pub. Date: Jan. 27, 2022

(65) Prior Publication Data
US 2023/0208233 A1    Jun. 29, 2023

(30) Foreign Application Priority Data
Jul. 20, 2020  (JP) .................. 2020-123623

(51) Int. Cl.
*H02K 3/04*  (2006.01)
*B60L 53/20* (2019.01)
(Continued)

(52) U.S. Cl.
CPC .............. *H02K 3/28* (2013.01); *B60L 53/20* (2019.02); *H02K 15/35* (2025.01);
(Continued)

(58) Field of Classification Search
CPC .. H02K 1/27; H02K 3/04; H02K 3/12; H02K 3/28; H02K 15/30; H02K 15/33;
(Continued)

(56) References Cited

U.S. PATENT DOCUMENTS 5,801,471 A * 9/1998 Hill ...................... H02K 3/12
                                                    310/182
6,208,058 B1   3/2001 Taji et al.
(Continued)

FOREIGN PATENT DOCUMENTS

DE    10239730 A1 *  3/2004 ......... H02K 15/0414
EP     3886297 A1 *  9/2021 ............... H02K 1/12
(Continued)

OTHER PUBLICATIONS

Japanese Office Action issued in corresponding JP Application No. 2020-123623 with Machine translation, dated Dec. 22, 2023 (11 pages).
(Continued)

*Primary Examiner* — Edgardo San Martin
(74) *Attorney, Agent, or Firm* — Foley & Lardner LLP

(57) ABSTRACT

A rotating electric machine having high efficiency and high reliability without causing an increase in size and cost is realized. Each of the rectangular wire segment coils has a first region portion and a second region portion connected to the first region portion and formed in the circumferential direction. Adjacent pairs of wire coils include a conductive portion to which the first region portion of one of the rectangular wire segment coils and the second region portion of the other of the rectangular wire segment coils are connected. Each of the plurality of layers includes a first layer in which the first region portion appears at an axial end portion and a second layer in which the second region
(Continued)

DETAILS OF PORTION A portion appears at an axial end portion when the coil end is viewed in an axial direction of the rotating electric machine.

11 Claims, 11 Drawing Sheets

(51) Int. Cl.
  *H02K 3/28* (2006.01)
  *H02K 15/30* (2025.01)
  *H02K 15/33* (2025.01)
  *H02K 15/35* (2025.01)
  *B61C 3/00* (2006.01)

(52) U.S. Cl.
  CPC ....... *B60L 2200/26* (2013.01); *B60L 2210/40* (2013.01); *B61C 3/00* (2013.01); *H02K 2213/03* (2013.01)

(58) Field of Classification Search
  CPC .... H02K 15/35; H02K 15/04; H02K 15/0414; H02K 15/0421; H02K 15/043; H02K 2213/03
  See application file for complete search history.

(56) References Cited

U.S. PATENT DOCUMENTS

| | | | | |
|---|---|---|---|---|
| 7,279,855 B2* | 10/2007 | Tahara | ............... | B60L 50/16 318/46 |
| 7,462,971 B2* | 12/2008 | Koide | ............... | H02K 3/47 310/156.43 |
| 7,759,835 B2* | 7/2010 | Inderka | ............... | H02K 3/12 310/201 |
| 8,659,202 B2* | 2/2014 | Ikeda | ............... | H02K 3/12 310/179 |
| 9,419,484 B2* | 8/2016 | Tokizawa | ............... | H02K 15/04 |
| 10,454,322 B2* | 10/2019 | Nakayama | ............... | H02K 3/12 |
| 12,113,414 B2* | 10/2024 | Ito | ............... | H02K 3/28 |
| 2001/0019210 A1* | 9/2001 | Fukasaku | ............... | B60W 20/10 290/40 C |
| 2012/0019085 A1 | 1/2012 | Koga et al. | | |
| 2013/0300246 A1* | 11/2013 | Kaimori | ............... | B60L 3/0061 310/201 |
| 2023/0223808 A1* | 7/2023 | Suto | ............... | H02K 15/085 310/208 |
| 2024/0039355 A1* | 2/2024 | Takahashi | ............... | H02K 3/28 |

FOREIGN PATENT DOCUMENTS

| | | | | | |
|---|---|---|---|---|---|
| JP | 2001-037131 | A | | 2/2001 | |
| JP | 2011-097660 | A | | 5/2011 | |
| JP | 2012-029441 | A | | 2/2012 | |
| JP | 2014100040 | A | * | 5/2014 | |
| JP | 2015-042047 | A | | 3/2015 | |
| JP | 6274476 | B2 | * | 2/2018 | ............... H02K 3/04 |
| JP | 2019146355 | A | * | 8/2019 | ............ B23K 26/24 |
| JP | 6848131 | B1 | * | 3/2021 | |
| WO | WO-2019208032 | A1 | * | 10/2019 | ............. F04B 49/10 |
| WO | WO-2022254806 | A1 | * | 12/2022 | ............... H02K 1/16 |

OTHER PUBLICATIONS

International Search Report with English Translation and Written Opinion of International Application No. PCT/JP2021/020342 dated Aug. 17, 2021.

English Translation of International Preliminary Report on Patentability and Written Opinion issued in PCT Application No. PCT/JP2021/020342 dated Feb. 2, 2023 (6 pages).

* cited by examiner

DETAILS OF PORTION A

B—B CROSS-SECTION

DETAILS OF PORTION A

DETAILS OF PORTION A

B—B CROSS-SECTION

DETAILS OF PORTION A

B—B CROSS-SECTION

DETAILS OF PORTION A

ROTATING ELECTRIC MACHINE AND METHOD FOR MANUFACTURING ROTATING ELECTRIC MACHINE

TECHNICAL FIELD

The present invention relates to a rotating electric machine mounted on a railway vehicle, an automobile, a construction machine, and the like, and a method for manufacturing the rotating electric machine.

BACKGROUND ART

In recent years, in order to increase the output of a motor, a method of increasing torque by applying a large current has been used. In order to flow a large current, it is important to suppress Joule loss (hereinafter, copper loss) generated in the conductor by increasing the conductor cross-sectional area in a limited motor volume.

In a drive motor of an automobile or the like, copper loss has been reduced by using a rectangular wire in order to improve a conductor cross-sectional area.

In general, when a rectangular wire is used, it is necessary to insert a U-shaped coil into a stator slot and then bend a straight portion. In this process, an insulation failure is likely to occur due to damage of the insulating paper or the coil coating, and a welding failure is likely to occur due to variation in bending angle or spring back, which is a problem in ensuring reliability.

In the technique described in PTL 1, as a countermeasure against this problem, a method has been proposed in which the coil pieces are formed of a first straight portion, a second straight portion, and a third straight portion via a bent portion so that bending is not required, and the ends of the coil pieces are joined to each other. The ends of the straight portions of the adjacent coil pieces are temporarily fixed to each other with a swaging tool.

CITATION LIST

Patent Literature

PTL 1: JP 2001-37131 A

SUMMARY OF INVENTION

Technical Problem

However, in the configuration of PTL 1, since the axial length is increased due to the third straight portion of the connection portion, the motor size and the motor weight are increased.

In addition, the number of steps of bending required is two for each coil piece, and there is a problem that the processing cost increases.

In addition, a swaging tool is required to prevent a positional deviation of the third straight portion, and there is a problem that the number of components and the number of work steps increase and the cost increases.

In addition, when the swaging tool is not used, there remains a problem that a welding failure occurs due to a positional deviation of the third straight portion.

In addition, in a case where a plurality of coil layers is provided in the radial direction in the same slot, it is necessary to change the circumferential length of the coil for respective layers, and there is also a problem that the number of components increases. An object of the present invention is to realize a rotating electric machine having high efficiency and high reliability without causing an increase in size and cost and a method for manufacturing the rotating electric machine.

Solution to Problem

In order to achieve the above object, the present invention is configured as follows.

A rotating electric machine includes a plurality of rectangular wire segment coils and a stator core having a slot that houses the plurality of rectangular wire segment coils, wherein the slot has a plurality of layers disposed in a radial direction of the rotating electric machine, each of the plurality of rectangular wire segment coils has an insertion portion disposed in the slot, and has a first region portion linearly formed along an axial direction of the rotating electric machine and a second region portion connected to the first region portion and formed along a circumferential direction including a bent portion in the circumferential direction of the stator core, wherein a pair of the rectangular wire segment coils adjacent to each other at coil ends of the plurality of rectangular wire segment coils includes a conductive portion to which the first region portion of one of the rectangular wire segment coils and the second region portion of the other of the rectangular wire segment coils are connected, wherein in the conductive portion, the second region portion has a conductive portion cross-section disposed on a same plane as an end portion cross-section of the first region portion, and the conductive portion cross-section is a cross-section in a direction different from a direction of a coil vertical cross-section of the second region portion, and wherein each of the plurality of layers includes a first layer in which the first region portion appears at an axial end portion and a second layer in which the second region portion appears at an axial end portion when the coil end is viewed in an axial direction of the rotating electric machine.

In addition, in a method of manufacturing a rotating electric machine including a plurality of rectangular wire segment coils and a stator core having a slot that houses the plurality of rectangular wire segment coils, wherein the slot has a plurality of layers disposed in a radial direction of the rotating electric machine, the method includes each of the plurality of rectangular wire segment coils having an insertion portion disposed in the slot, and forming a first region portion linearly along an axial direction of the rotating electric machine and forming a second region portion connected to the first region portion and along a circumferential direction including a bent portion in the circumferential direction of the stator core, wherein a pair of the rectangular wire segment coils adjacent to each other at coil ends of the plurality of rectangular wire segment coils includes a conductive portion to which the first region portion of one of the rectangular wire segment coils and the second region portion of the other of the rectangular wire segment coils are connected, wherein in the conductive portion, the second region portion has a conductive portion cross-section disposed on a same plane as an end portion cross-section of the first region portion, and the conductive portion cross-section is a cross-section in a direction different from a direction of a coil vertical cross-section of the second region portion, and wherein each of the plurality of layers includes a first layer in which the first region portion appears at an axial end portion and a second layer in which the second region portion appears at an axial end portion when the coil end is viewed in an axial direction of the rotating electric machine.

ADVANTAGEOUS EFFECTS OF INVENTION

According to the present invention, it is possible to realize a rotating electric machine having high efficiency and high reliability without causing an increase in size and cost and a method for manufacturing the rotating electric machine.

Problems, configurations, and effects other than those described above will become apparent from the following description of embodiments.

DESCRIPTION OF EMBODIMENTS

Hereinafter, embodiments of the present invention will be described with reference to the drawings.

In the following description, the same components are given the same symbols. Their names and functions are the same, and duplicate explanations should be avoided. In the present invention, the definition of "coil" is one turn of hexagonal winding or one cycle of wave winding. For example, a configuration in which a coil is wound four times is expressed as a four-turn coil, but the following description is, for the sake of simplicity, basically directed to a one-turn coil (coil per turn).

In addition, when the coil of one turn is configured by a plurality of conductors, each conductor is referred to as a segment coil. In addition, although the following description is directed to a rotating electric machine of variable speed drive such as an automobile and a railway vehicle, the effect of the present invention is not limited thereto, and can be applied to all rotating electric machines including a constant speed.

In addition, the rotating machine may be an induction machine, a permanent magnet synchronous machine, a winding type synchronous machine, a synchronous reluctance rotating machine, or a switched reluctance rotating machine. The following description is directed to the rotating electric machine of the inner rotation type, but may be directed to the rotating electric machine of the outer rotation type.

The material of the coil may be copper, aluminum, or another conductive material. In addition, although the cross-sectional shape of the coil is described for a single rectangular wire, the effect of the present invention is not limited thereto, and a plurality of round wires or the like may be aligned or molded to form a rectangular shape.

Embodiments

First Embodiment

Hereinafter, the first embodiment of the present invention will be described with reference to FIGS. 1A to 8.

Figure 2A:
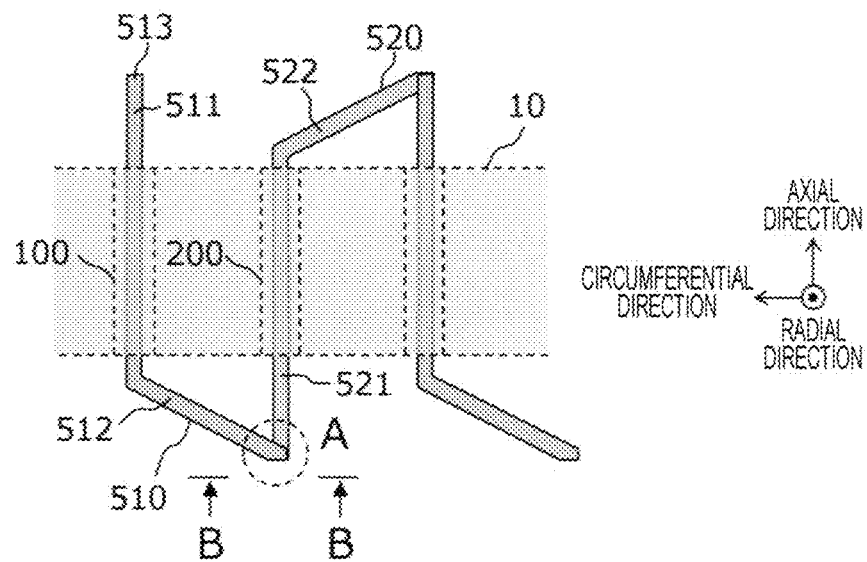
FIG. 2A is an explanatory diagram of a coil shape in the first embodiment of the present invention.
Figure 2B:
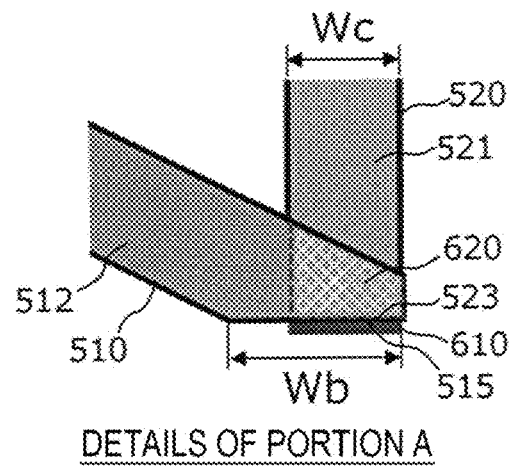
FIG. 2B is a detailed view of a portion A in FIG. 2A.
Figure 2C:
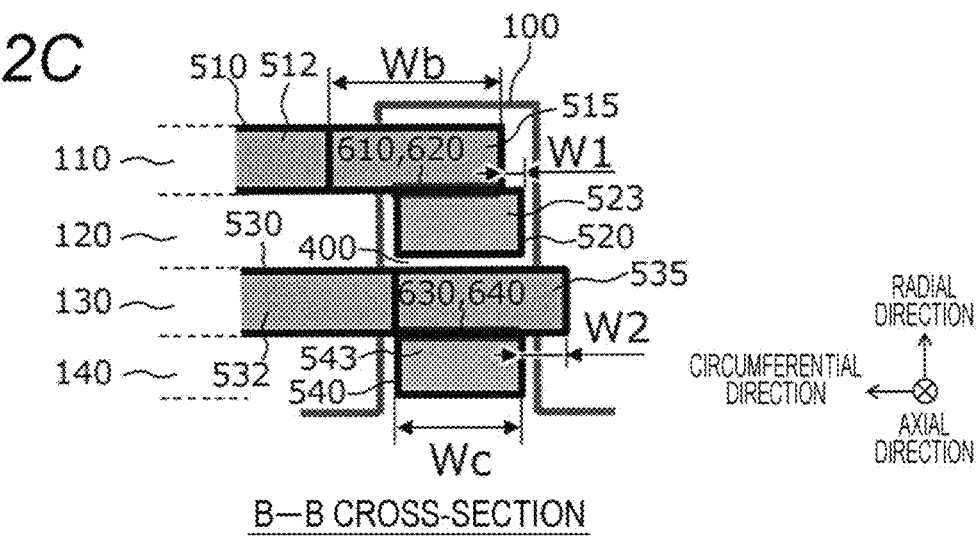
FIG. 2C is a cross-sectional view taken along line B-B in FIG. 2A.
Figure 3A:
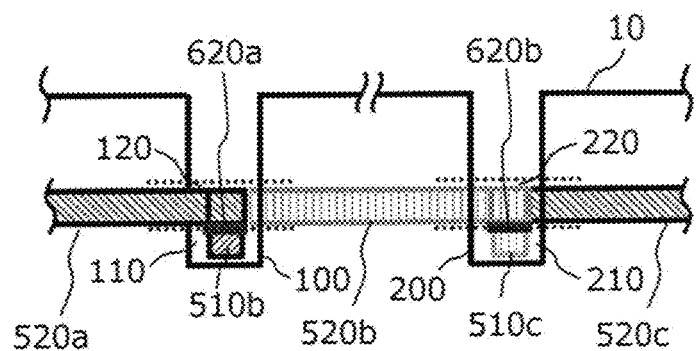
FIG. 3A is an explanatory diagram of an overall configuration of a coil according to the first embodiment of the present invention.
Figure 3B:
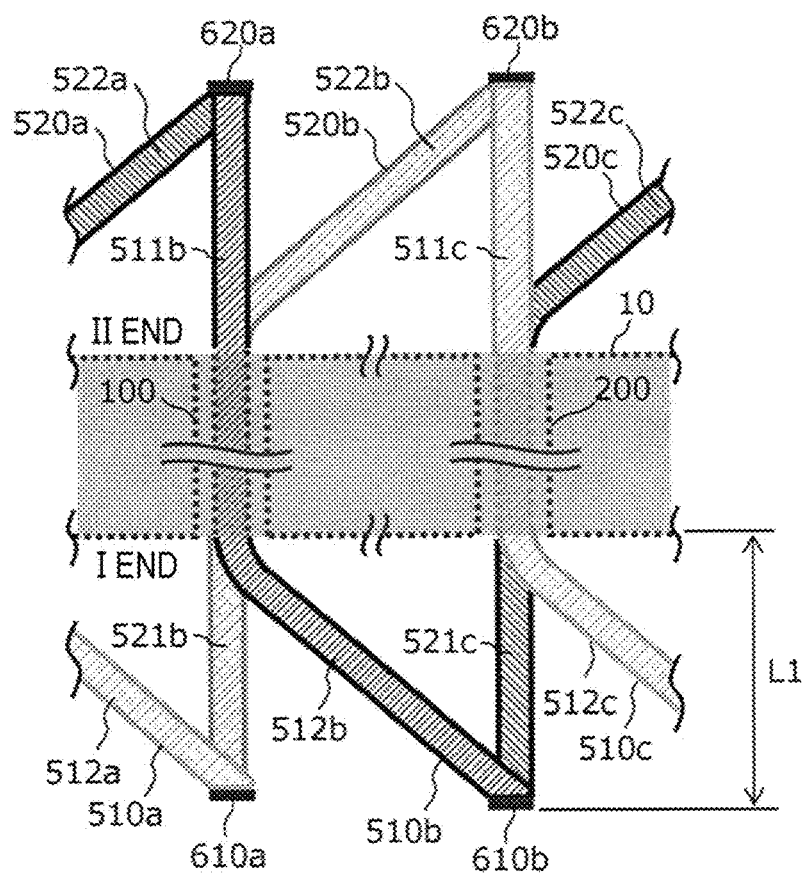
FIG. 3B is an explanatory diagram of an overall configuration of a coil according to the first embodiment of the present invention.
Figure 3C:
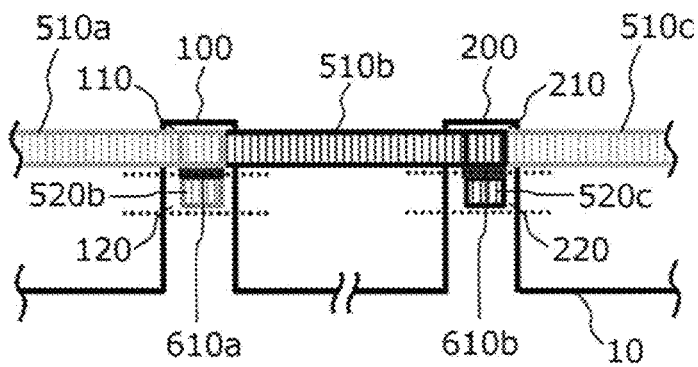
FIG. 3C is an explanatory diagram of an overall configuration of a coil in the first embodiment of the present invention.
Figure 4A:
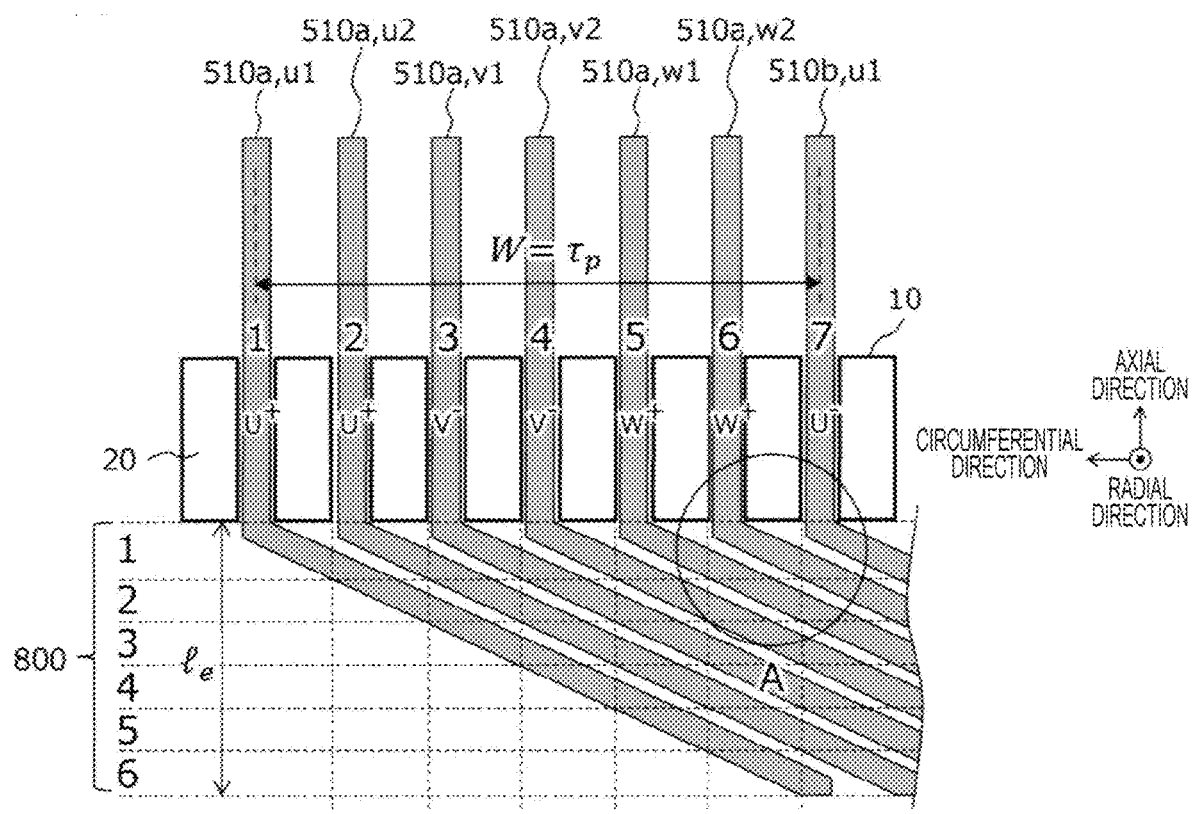
FIG. 4A is an explanatory diagram of a coil end length in the first embodiment of the present invention.
Figure 4B:
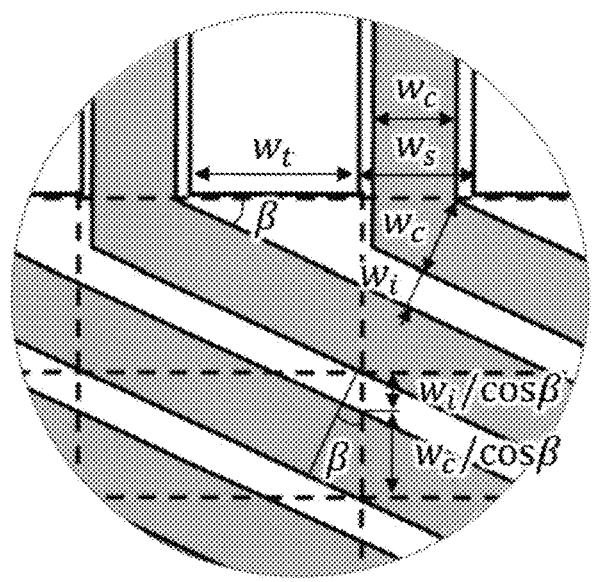
FIG. 4B is a detailed view of a portion A in FIG. 4A.
Figure 5A:
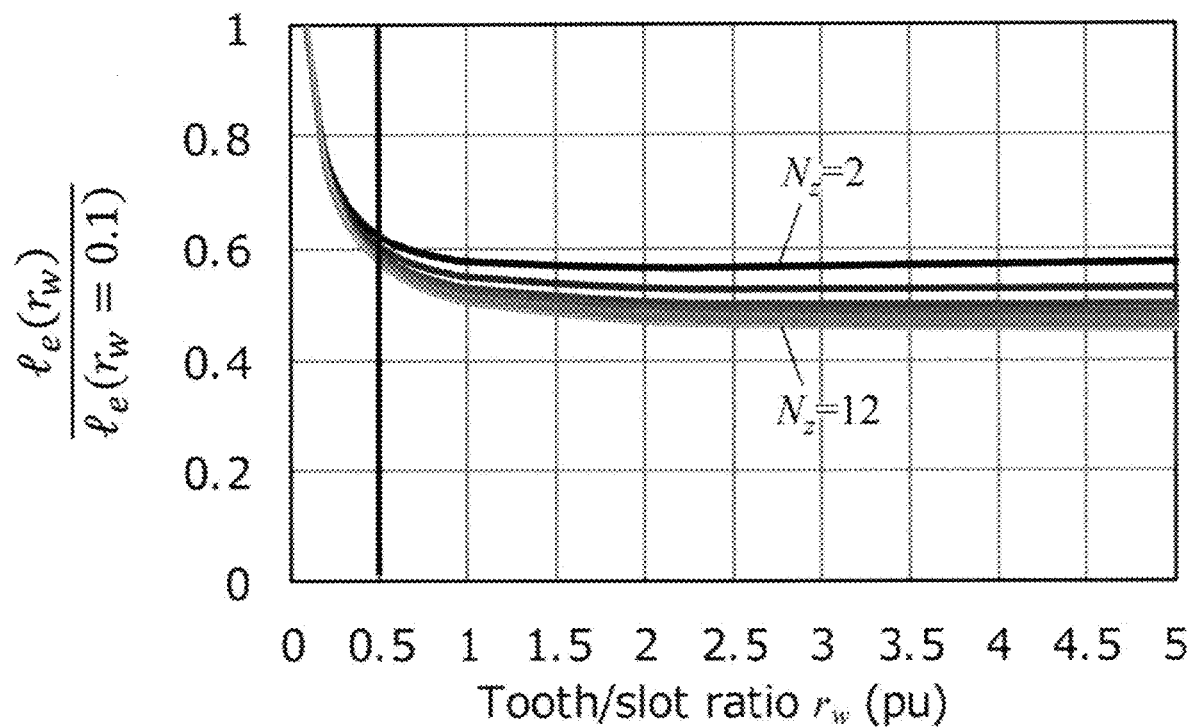
FIG. 5A is an explanatory diagram of a dimensional relationship of a coil end in the first embodiment of the present invention.
Figure 5B:
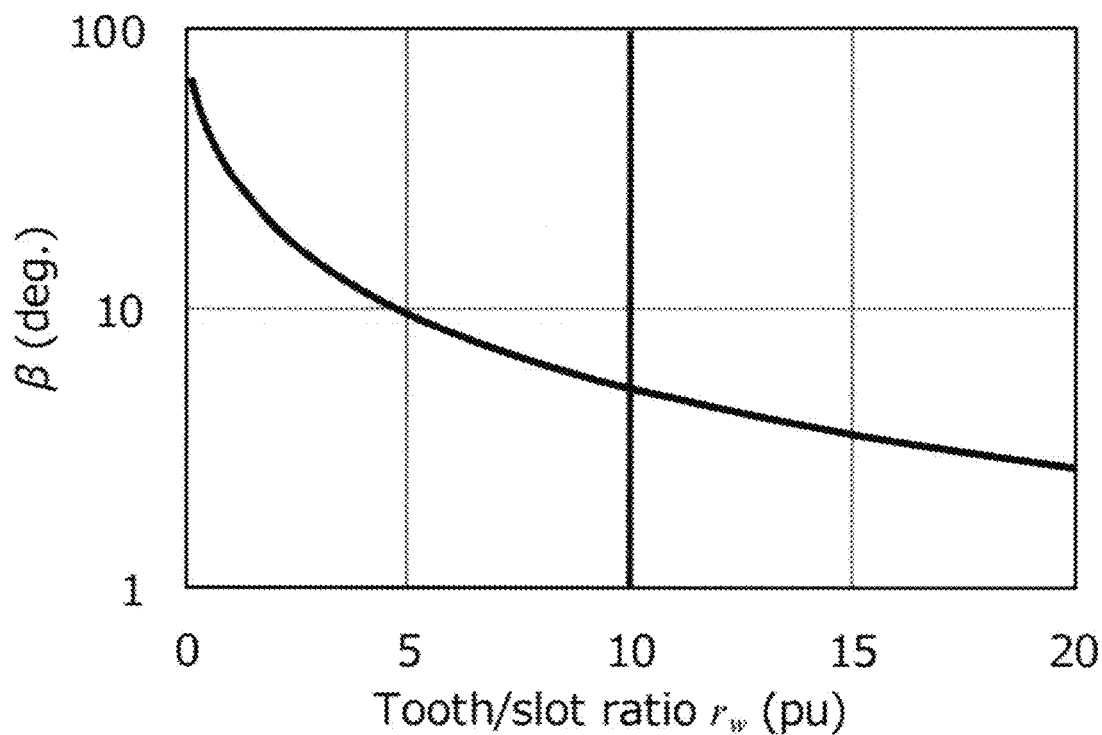
FIG. 5B is an explanatory diagram of a dimensional relationship of a coil end in the first embodiment of the present invention.
Figure 6A:
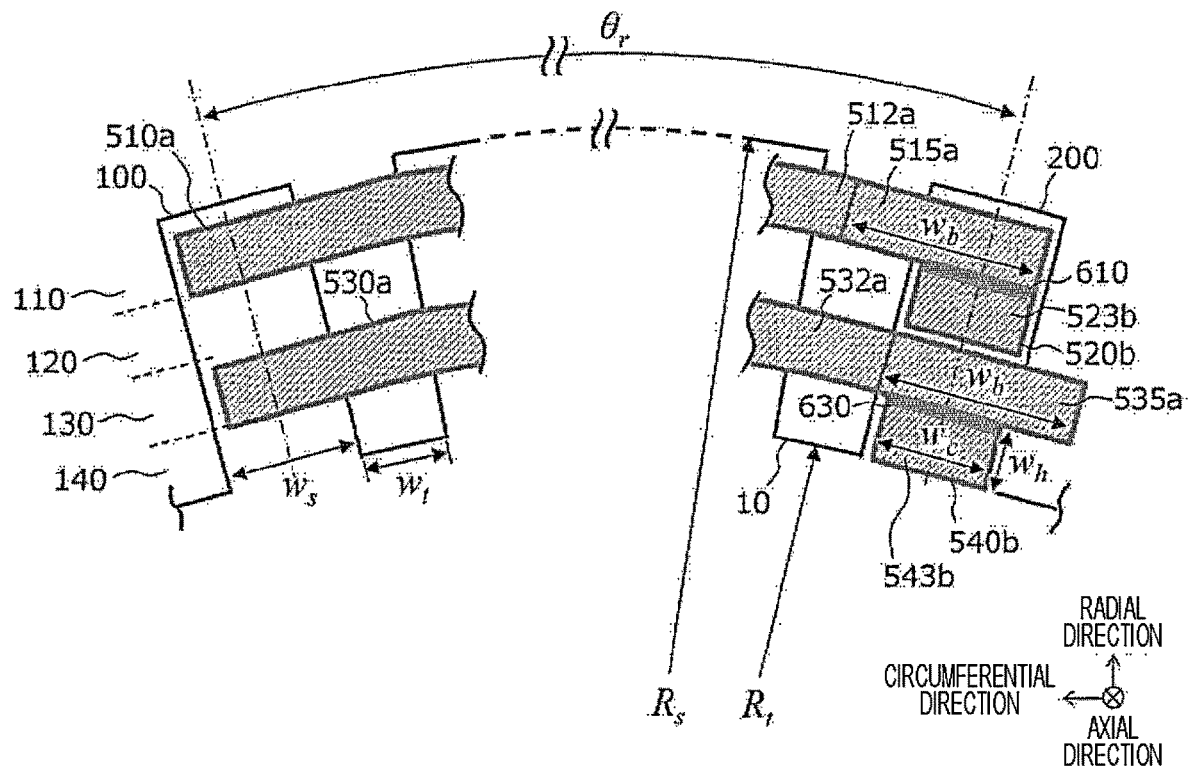
FIG. 6A is an explanatory diagram of the circumferential length of a coil in the first embodiment of the present invention.
Figure 6B:
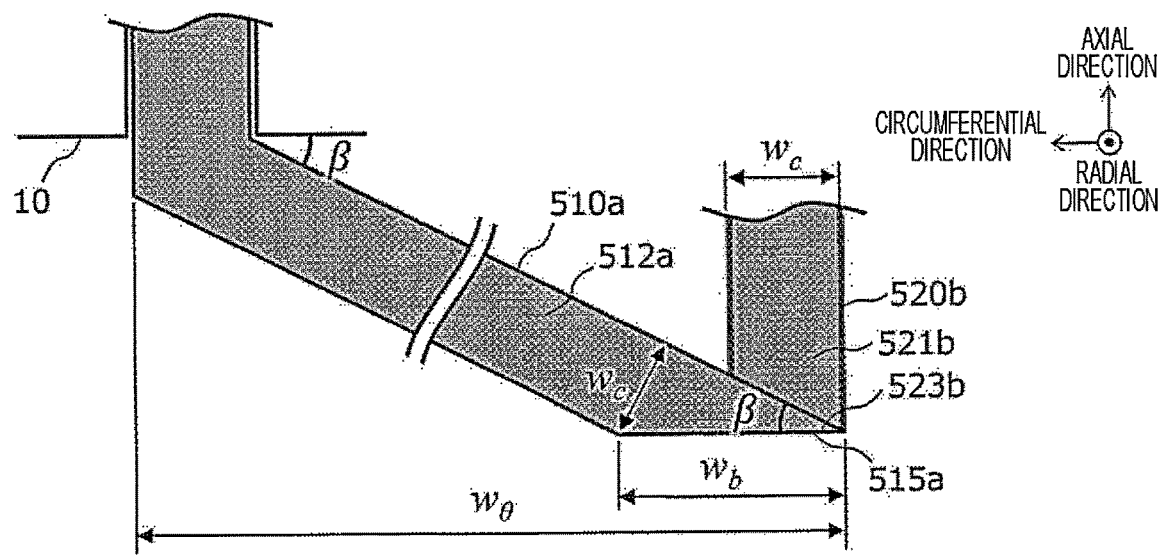
FIG. 6B is an explanatory diagram of the circumferential length of a coil in the first embodiment of the present invention.
Figure 7:
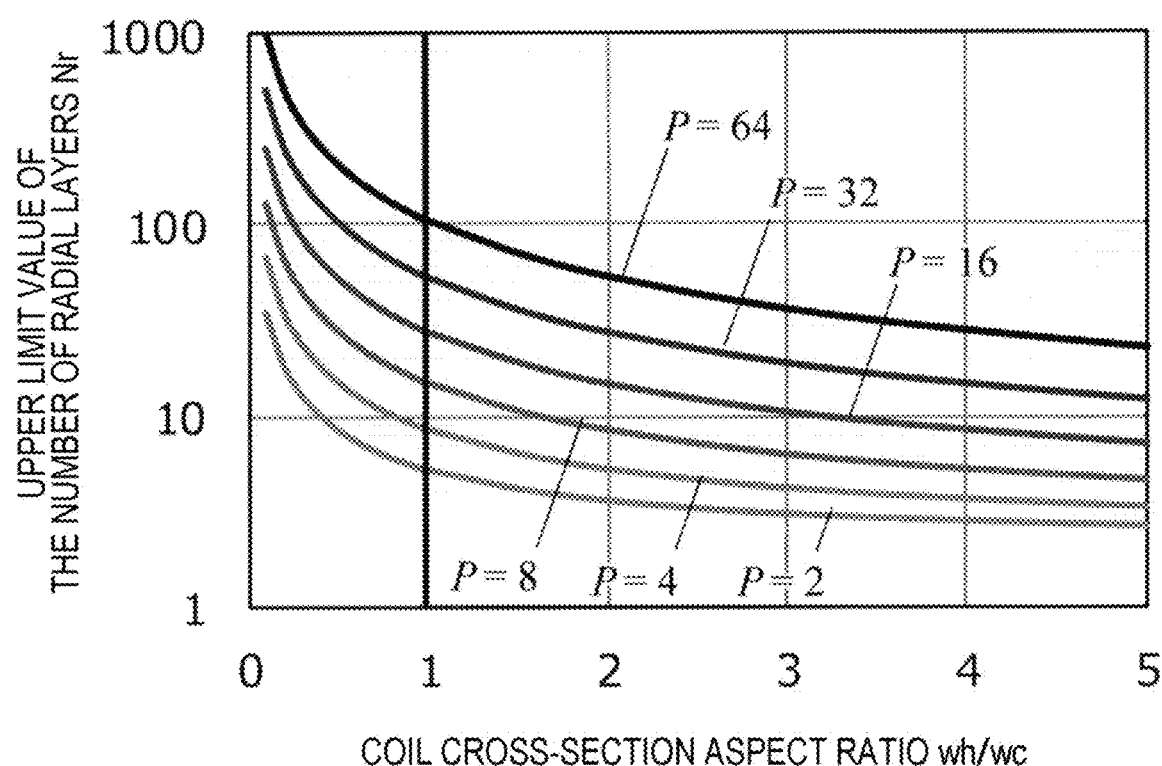
FIG. 7 is an explanatory diagram of the number of radial layers and a dimensional relationship in the first embodiment of the present invention.
Figure 8:
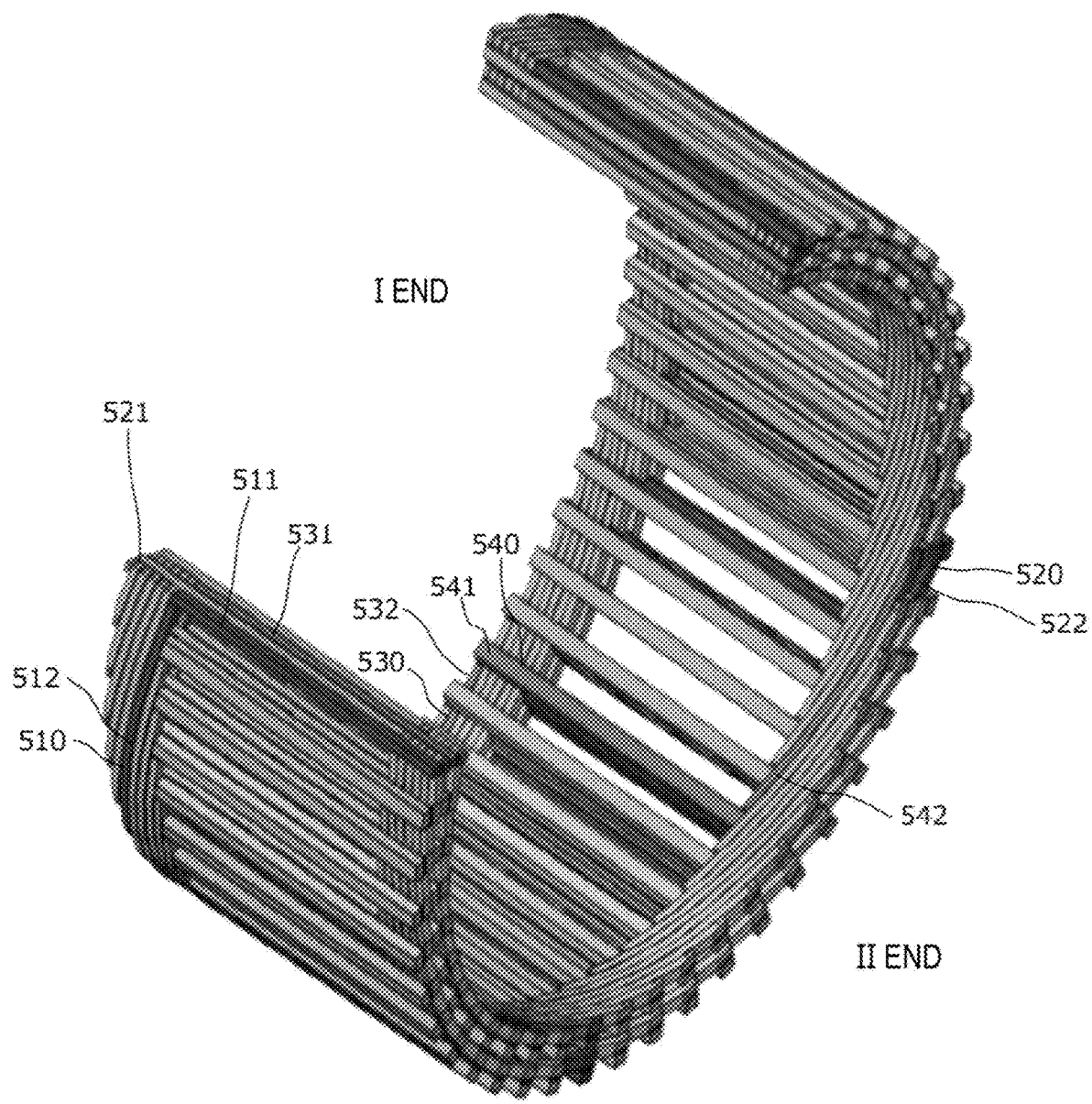
FIG. 8 is an explanatory diagram of an external appearance of a coil in the first embodiment of the present invention.

FIGS. 1A to 1G are explanatory diagrams of a coil shape of a rotating electric machine according to the first embodiment of the present invention. FIGS. 2A to 2C are explanatory diagrams of a modification of the coil shape of the rotating electric machine according to the first embodiment of the present invention. FIGS. 3A to 3C are explanatory diagrams of an overall configuration of a coil according to the first embodiment of the present invention. FIGS. 4A and 4B are explanatory diagrams of a coil end length of the coil end 800 of the first embodiment of the present invention. FIGS. 5A and 5B are explanatory diagrams of a dimensional relationship of a coil end according to the first embodiment of the present invention. FIGS. 6A and 6B are explanatory diagrams of the circumferential length of a coil of the first embodiment of the present invention. FIG. 7 is an explanatory diagram of the number of radial layers and a dimensional relationship according to the first embodiment of the present invention. FIG. 8 is an explanatory diagram of an external appearance of a coil according to the first embodiment of the present invention.

First, a coil shape in the first embodiment of the present invention will be described with reference to FIGS. 1A to 1G.

Figure 1A:
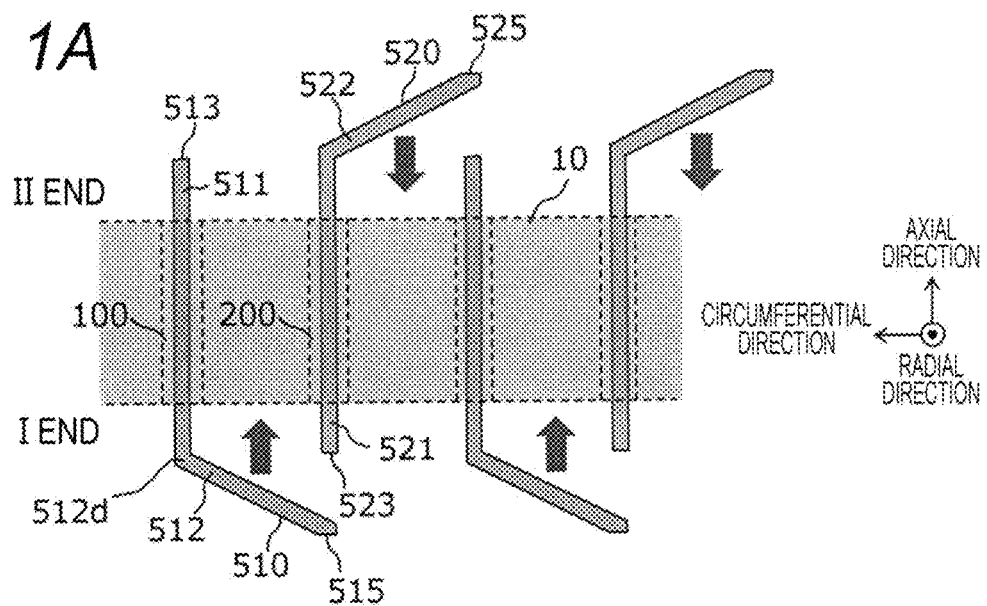
FIG. 1A is an explanatory diagram of a coil shape in the first embodiment of the present invention.

In FIG. 1A, a stator core 10 includes an inner rotor (not illustrated) rotatably supported in the circumferential direction with a gap at the radially inner periphery.

The stator core 10 has a plurality of slots 100, 200, . . . in the circumferential direction, and a first segment coil 510 and a second segment coil 520, . . . (hereinafter, may be referred to as a coil), which are a plurality of rectangular wire segment coils, are inserted and housed in the slots 100, 200, . . . .

The coils 510 and 520 are coated with an insulating film such as an epoxy resin in order to ensure insulation between the coils. In addition, in order to ensure insulation between the coils 510 and 520 and the stator core 10, the slots 100 and 200 are provided with an insulating paper or an insulating resin bobbin. The coil 510 includes a first region portion 511 having an insertion portion inserted and disposed in the slot 100 and formed linearly along the axial direction, a second region portion 512 connected to the first region portion 511 and formed along the circumferential direction including a bent portion 512d in the circumferential direction, an end portion cross-section 513 formed at a terminal end of the first region portion 511, and an end portion cross-section 515 formed at a terminal end of the second region portion 512.

Similarly, the coil 520 includes a first region portion 521 having an insertion portion into the slot 200 and formed linearly along the axial direction, a second region portion 522 connected to the first region portion 521 and formed along the circumferential direction including a bent portion in the circumferential direction, an end portion cross-section 523 formed at a terminal end of the first region portion 521, and an end portion cross-section 525 formed at a terminal end of the second region portion 522.

As illustrated in FIG. 1A, the coils 510 and 520 molded in advance are inserted from the I end and the II end which are axial end portions, respectively. At this time, as illustrated in FIG. 1C illustrating details of a portion A surrounded by a broken line in FIG. 1B, the second region portion end portion cross-section 515 of the inserted coil 510 is disposed on the same cross-section as the first region portion end portion cross-section 523 of the coil 520, and the coils 510 and 520 are electrically and mechanically connected by a linear conductive portion 610.

At this time, second region portion end portion cross-section 515 of coil 510 is different from a vertical cross-section 514 (shown in FIG. 1B) of the second region portion 512 of the coil 510. In addition, the linear conductive portion 610 is different from the conventional TIG welded portion in that it does not have a straight portion extending in the axial direction. Such a linear conductive portion 610 is realized by electron beam welding or laser welding, and is characterized by forming a welding line extending in the circumferential direction when the coil end is viewed in the axial direction as illustrated in B-B cross-section of FIG. 1D. The welding line extending in the circumferential direction is the linear conductive portion 610.

Figure 1B:
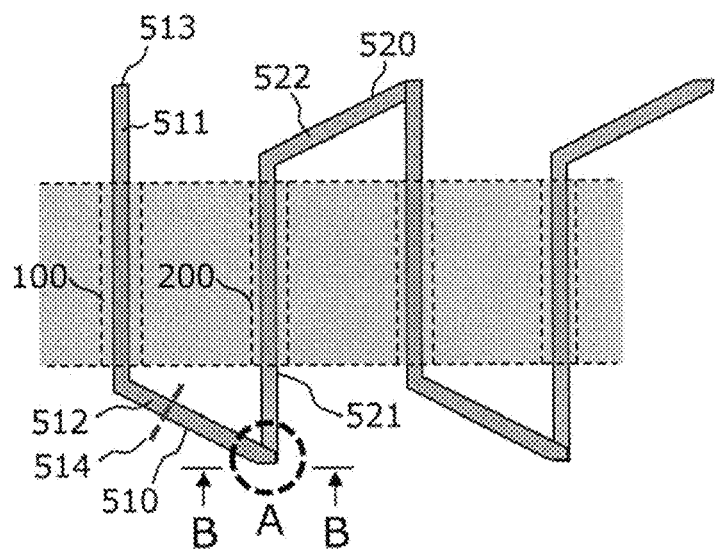
FIG. 1B is an explanatory diagram of a coil shape in the first embodiment of the present invention.
Figure 1C:
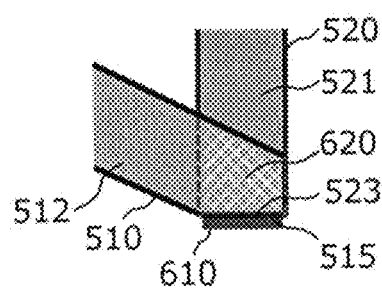
FIG. 1C is a detailed view of a portion A in FIG. 1B.
Figure 1D:
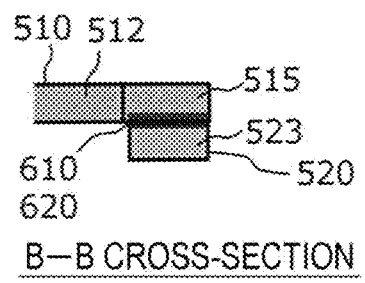
FIG. 1D is a cross-sectional view taken along line B-B in FIG. 1B.

Instead of the linear conductive portion 610 or together with the linear conductive portion 610, the coils 510 and 520 may be electrically and mechanically connected by a planar conductive portion 620 illustrated in detail of the portion A in FIG. 1C. The planar conductive portion 620 is characterized in that the radially inner peripheral face of the end portion of the second region portion 512 of the coil 510 and the radially outer peripheral face of the end portion of the first region portion 521 of the coil 520 are caused to be in contact with each other.

Also in this case, the planar conductive portion 620 is different from the conventional TIG welded portion in that it does not have a straight portion extending in the axial direction. The planar conductive portion 620 causes the coil 510 and the coil 520 to be in contact with each other in a state where the insulating film is peeled off or in a state where electric conduction is secured. A conductive member such as a conductive paste, a conductive sheet, or a conductive adhesive may be interposed between the coil 510 and the coil 520. In addition, at least one end portion of the coil 510 and the coil 520 may be subjected to metal plating in advance, and conductivity may be improved by performing metal plating at the time of forming the planar conductive portion 620.

Furthermore, by using a material having a relatively low melting point such as zinc or tin as the above-described metal plating material and performing heat treatment until the metal plating material is melted in the state illustrated in FIG. 1C, the planar conductive portion 620 may be mechanically connected as well as electrically via the metal plating material.

The planar conductive portion 620 and the linear conductive portion 610 may be provided at the same time.

Here, the shape of the second region portion end portion cross-section 515 of the coil 510 may be formed so as to be different from the vertical cross-section 514 by adjusting a cutting direction, a cutting load, and the like when the coil 510 is cut, or may be formed so as to be different by other methods.

In addition, the end portion cross-section 515 may be disposed on the same cross-section as the first region portion end portion cross-section 523 of the coil 520, and is not limited to the form illustrated in FIG. 1B, and any other form may be used.

Figure 1E:
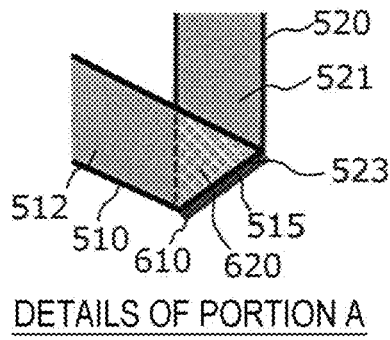
FIG. 1E is a diagram illustrating a modification of the example illustrated in FIG. 1C.
Figure 1F:
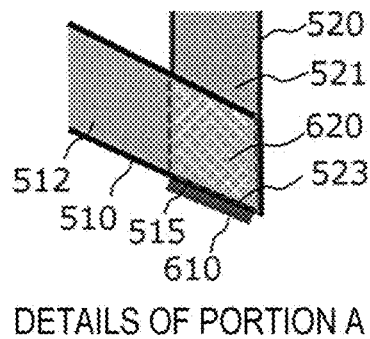
FIG. 1F is a diagram illustrating another modification of the example illustrated in FIG. 1C.

For example, as illustrated in FIGS. 1E and 1F, when the end portion cross-section 523 of the coil 520 is different from the vertical cross-section of the coil 520, the cutting direction may be adjusted such that the end portion cross-section 515 of the coil 510 is disposed on the same cross-section as the end portion cross-section 523 of the coil 520. Also in this case, the coils 510 and 520 are electrically and mechanically connected by either or both of the linear conductive portion 610 and the planar conductive portion 620.

Figure 1G:
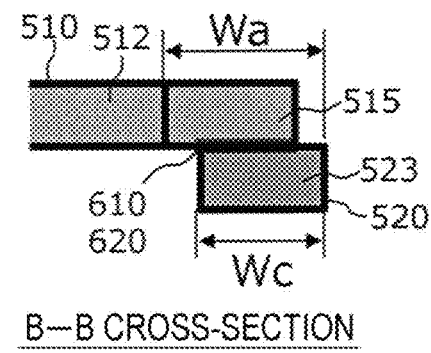
FIG. 1G is a diagram illustrating a modification of the example illustrated in FIG. 1D.

As long as the form as described above is secured, the end portion cross-section 515 of the coil 510 and the end portion cross-section 523 of the coil 520 do not necessarily have to be in a state where the circumferential positions match with each other, and may be deviated in the circumferential direction as illustrated in FIG. 1G. In FIG. 1G, a length obtained by adding the circumferential width of the end portion cross-section 515 to the circumferential width wc of the end portion cross-section 523 of the coil 520 and subtracting the circumferential width of the overlapping portion of the both is wa, and wc<wa is satisfied. Even in this state, the coils 510 and 520 are electrically and mechanically connected by either or both of the linear conductive portion 610 and the planar conductive portion 620.

Therefore, since it is not necessary to prevent positional deviation of the coils, positioning by a swaging tool or the like is unnecessary.

As described above, according to the present invention, since it is only necessary to insert the coil molded in advance into the stator core 10, it is possible to solve the problem that an insulation failure occurs due to damage of an insulating paper or a coil coating, or a welding failure occurs due to variation in bending angle or spring back.

In addition, since there is no straight portion extending in the axial direction in the connection portion, it is possible to solve the problem that the axial length increases and the motor size and the motor weight increase.

In addition, since the number of steps of bending per coil may be one, it is possible to solve the problem of an increase in processing cost in coil molding.

In addition, since a swaging tool for preventing positional deviation at the connection portion is unnecessary, it is possible to solve the problem that the number of components and the number of work steps increase and the cost increases.

Next, a coil shape according to a modification of the first embodiment of the present invention will be described with reference to FIGS. 2A to 2C. The difference between the example shown in FIGS. 1A to 1G and the example shown in FIGS. 2A to 2C is the shape of the end portion cross-section 515 of the coil 510.

As illustrated in detail of the portion A in FIG. 2B, when the circumferential width of the end portion cross-section 515 of the coil 510 is wb, and the circumferential width of the end portion cross-section 523 of the coil 520 is wc, wc<wb.

On the other hand, in FIG. 2C illustrating the B-B cross-section of FIG. 2A, the slot 100 has a first layer 110, a second layer 120, a third layer 130, and a fourth layer 140 disposed in the radial direction of the rotating electric machine.

The second region portion 512 of the first segment coil 510 appears in the first layer 110, the first region portion end portion cross-section 523 of the second segment coil 520 appears in the second layer 120, the second region portion 532 of the third segment coil 530 (shown in FIG. 8) appears in the third layer 130, and the first region portion end portion cross-section 543 of the fourth segment coil 540 (shown in FIG. 8) appears in the fourth layer 140.

The coils 510 and 520 are electrically and mechanically connected by either or both of the linear conductive portion 610 and the planar conductive portion 620. As long as the above-described form is secured, the end portion cross-section 515 of the coil 510 and the end portion cross-section 523 of the coil 520 may be deviated by w1 in the circumferential direction as in the B-B cross-section illustrated in FIG. 2C.

Similarly, the coils 530 and 540 are electrically and mechanically connected by either or both of the linear conductive portion 630 and the planar conductive portion 640. As long as the above-described form is secured, the end portion cross-section 535 of the coil 530 and the end portion cross-section 543 of the coil 540 may be deviated by w2 in the circumferential direction as in the B-B cross-section illustrated in FIG. 2C.

Note that a layer short circuit can be avoided by providing an inter-layer gap 400 between the coil 520 and the coil 530. A non-conductive and non-magnetic material such as an insulating paper, an insulating sheet, or an insulating resin may be disposed in the inter-layer gap 400.

In addition, when the insulating films of the coils 520 and 530 have sufficient dielectric strength, a metal material may be disposed in the inter-layer gap 400.

In this way, by configuring the end portion cross-section 515 of the coil 510 and the end portion cross-section 523 of the coil 520 to have the relationship of wc<wb, it is not necessary to strictly prevent the occurrence of the positional deviation of the coils, and thus, it is not necessary to perform the alignment by a swaging tool or the like.

In addition, in the connection of the coils 530 and 540 disposed in layers different from the layers of the coils 510 and 520, it is not necessary to strictly prevent the occurrence of the positional deviation of the coils, and thus, it is not necessary to perform alignment by a swaging tool or the like.

In addition, since the same type of coil can be used for a plurality of layers, it is not necessary to change the circumferential length of the coil for respective layers, and the problem of an increase in the number of components can be solved.

Next, the overall structure of the coil according to the first embodiment of the present invention will be described with reference to FIGS. 3A, 3B, and 3C. FIG. 3B is a plan view when viewed from the radially outer periphery, and FIGS. 3A and 3C are side views when viewed in the respective axial directions. The difference from the example illustrated in FIGS. 1A to 1G is that the coils 510a, 510b, and 510c are disposed in the circumferential direction of the first layer 110, and the coils 520a, 520b, and 520c are disposed in the circumferential direction of the second layer 120.

At the I end, the coil 510a and the coil 520b are electrically and mechanically connected by the linear conductive portion 610a, and the coil 510b and the coil 520c are electrically and mechanically connected by the linear conductive portion 610b. When the coil end at the I end is viewed in the axial direction, the second region portions 512a, 512b, and 512c of the coils 510a, 510b, and 510c appear in the first layer 110, and the first region portions 521b and 521c of the coils 520b and 520c appear in the second layer 120.

On the other hand, at the II end, the coil 520a and the coil 510b are electrically and mechanically connected by the linear conductive portion 620a, and the coil 520b and the coil 510c are electrically and mechanically connected by the linear conductive portion 620b. When the coil end at the II end is viewed in the axial direction, the first region portions 511b and 511c of the coils 510b and 510c appear at the II end that is the axial end portion in the first layer 110, and the second region portions 522a, 522b, and 522c of the coils 520a, 520b, and 520c appear at the II end that is the axial end portion in the second layer 120.

In the coil configuration of the present invention, since the segment coils 510a, 510b, and 510c are disposed in the first layer and the segment coils 520a, 520b, and 520c are disposed in the second layer, the coils do not move to different layers.

That is, since the segment coil has only one bent portion between the first region portion and the second region portion, the number of steps of bending required in the coil molding is one, and the problem that the processing cost increases can be solved.

In FIGS. 3A to 3C, the coil end portions may be electrically and mechanically connected by the planar conductive portions 620 (610a, 610b) instead of the linear conductive portions 610 (620a, 620b), or both of them may be used.

In addition, the form of the coil end is not limited to the form of FIGS. 3A to 3C, and may be forms of FIGS. 1A to 1G, FIGS. 2A to 2C, or other forms.

Next, a coil end length in the present invention will be described with reference to FIGS. 4A and 4B. FIG. 4B is a detailed view of portion A illustrated in FIG. 4A.

In FIGS. 4A and 4B, coils 510a and 510b are disposed in the circumferential direction of the first layer. The coil 510a includes coils of 6 slots disposed between the stator teeth 20, and has a winding arrangement of distributed windings with the winding span W=τp in which the number of phases m=3, the number of slots per pole per phase q=2, and τp is a pole pitch.

When slot numbers 1 to 7 are allocated in order from the left in FIG. 4A, the coil 510a, u1 inserted into the slot 1 goes beyond five slots and is connected to the coil 520b, u1 (not illustrated) inserted into the second layer of the slot 7.

Similarly, each of the coils 510a, u2, and 510a, v1, . . . inserted into the slots 2, 3, . . . goes beyond five slots, and they are connected to the respective coils 520b, u2, and 520b, v1, . . . (not illustrated) inserted into the second layer of the slots 8, 9, . . . .

As can be seen from FIG. 4A, all the coils have the same shape, and the axial lengths (hereinafter, referred to as a coil end length for short) le of the coil ends are also the same. The coil end length le increases as the number of slots to be crossed increases. That is, the larger the number of phases m, the number of slots per pole per phase q, and the winding span W/τp (≤1), the larger the length. Since an increase in the coil end length le leads to an increase in the motor size and the motor weight, it is important to make le as small as possible.

Therefore, in the present invention, as will be described below, the coil end length le is formulated, and then a dimensional condition for minimizing the coil end length le has been newly found.

First, in formulating the coil end length le, the number of slots beyond which the coil goes is referred to as "the number of axial layers Nz" and is defined as Expression (1).

[Math 1]
$$N_z = \frac{w}{\tau_p} \times q \times m \tag{1}$$

In the example illustrated in FIG. 4A, Nz=6. As is clear from FIG. 4A, the coil end length le increases as the number of axial layers Nz increases.

The coil end length le can be formulated as Expression (2) by using the dimensional relationship illustrated in detail of the portion A in FIG. 4B.

[Math 2]
$$\ell_e = w_t \cdot \tan\beta + N_z \cdot \frac{w_c}{\cos\beta} + (N_z - 1) \cdot \frac{w_i}{\cos\beta} \tag{2}$$

where wt is a width of the stator tooth 20, ws is a slot width, wc is a coil width, wi is a distance between the coils at the coil end, and β is a coil inclination angle with respect to the axial end face of the stator core 10.

In addition, the inclination β can also be expressed by Expression (3) by using the dimensional relationship of the detail of the portion A in FIG. 4B.

[Math 3]
$$\sin\beta = \frac{w_c + w_i}{w_s + w_t} \tag{3}$$

In a general rotating electric machine, the approximation of Wc≈Ws, and Wc>>Wi holds, and thus Expressions (4) and (5) are obtained by applying the approximation to Expressions (2) and (3).

[Math 4]
$$\ell_e \approx w_t \cdot \tan\beta + N_z \cdot \frac{w_s}{\cos\beta} \tag{4}$$

[Math 5]
$$\beta \approx Sin^{-1} \frac{w_s}{w_s + w_t} \tag{5}$$

From Expressions (4) and (5), it can be seen that the coil end length le and the coil inclination angle β are functions of ws, wt, and Nz. Here, the ratio rw of the tooth width wt to the slot width ws is defined as in Expression (6).

[Math 6]
$$r_w = \frac{w_t}{w_s} \tag{6}$$

When Expression (6) is used, Expressions (4) and (5) can be expressed as Expressions (7) and (8).

[Math 7]
$$\ell_e = \left(r_w \cdot \tan\beta + \frac{N_z}{\cos\beta}\right) \cdot w_s \tag{7}$$

[Math 8]
$$\beta = Sin^{-1} \frac{1}{1 + r_w} \tag{8}$$

In Expressions (7) and (8), when the coil end length le when rw=0.1 (the tooth width wt is 1/10 of the slot width ws) with respect to the number of axial layers Nz is set as a reference value, the coil end length le (rw) is expressed by Expression (9) for a change in rw.

[Math 9]
$$\frac{\ell_e(r_w)}{\ell_e(r_w = 0.1)} = \frac{r_w \cdot \tan\beta + \frac{N_z}{\cos\beta}}{0.1 \cdot \tan\beta + \frac{N_z}{\cos\beta}} \tag{9}$$

The relationship between the left side of Expression (9) and rw is illustrated in FIG. 5A. As a representative example, only the curves of Nz=2 and Nz=12 are indicated, and the indication is omitted for the curves of Nz=3, 4, . . . , 11 drawn between the curves.

As can be seen from FIG. 5A, the coil end length le can be reduced as rw is increased. However, in the range of rw>0.5 (the tooth width wt is half or more of the slot width ws), the coil end length le converges to a substantially constant value, and this tendency applies to any Nz.

On the other hand, the relationship between β and rw obtained by Expression (8) is illustrated in FIG. 5B. Since β is a function of only rw, β is independent of Nz.

As can be seen from FIG. 5B, β decreases as rw increases, and this contributes to reduction in the coil end length le. However, in the range of rw>10 (the tooth width wt is 10 times or more the slot width ws), the reduction tendency of β is almost converged, and a large effect on the reduction in the coil end length cannot be expected.

From the above, in the present invention, the following has been found as dimensional conditions under which the coil end length le can be minimized.

[Math 10]

$$0.5 \le \frac{w_t}{w_s} \le 10 \quad (10)$$

Next, the circumferential length of the coil end in the first embodiment of the present invention will be described with reference to FIGS. 6A and 6B.

In FIG. 6A, the first slot 100 is configured with four layers, and the first layer 110, the second layer 120, the third layer 130, and the fourth layer 140 are disposed in order from the radially outer periphery. The second slot 200 is similarly configured with four layers. The first region portion 511*a* (not illustrated) of the first segment coil 510*a* is inserted into the first layer 110 of the slot 100, and the second region portion 512*a* and the second region portion end portion cross-section 515*a* appear in the coil end portion as illustrated in FIG. 6A.

The first region portion end portion cross-section 523*b* of the second segment coil 520*b* appears in the second layer of the second slot 200. The coil 510*a* and the coil 520*b* are electrically and mechanically connected by the linear conductive portion 610.

Similarly, the first region portion 531*a* (not illustrated) of the third segment coil 530*a* is inserted into the third layer 130 of the slot 100, and as illustrated in FIG. 6A, the second region portion 532*a* and the second region portion end portion cross-section 535*a* appear in the coil end portion.

The first region portion end portion cross-section 543*b* of the fourth segment coil 540*b* appears in the fourth layer of the second slot 200. The coil 530*a* and the coil 540*b* are electrically and mechanically connected by the linear conductive portion 630.

Note that, in FIG. 6A, since it is sufficient to be able to discuss the coil arrangement, description of other coils is omitted.

FIG. 6B illustrates the arrangement of the coils 510*a* and 520*b* when FIG. 6A is viewed from the radially outer periphery. In FIG. 6B, wc<wb where wb is a circumferential width of the end portion cross-section 515*a* of the second region portion 512*a* of the coil 510*a*, and wc is a circumferential width of the coil 520*b*. The second region portion 512*a* of the coil 510*a* is inclined by an angle β with respect to the axial end face of the stator core 10.

As illustrated in FIGS. 6A and 6B, the right end of the end portion cross-section 515*a* of the coil 510*a* and the right end of the end portion cross-section 523*b* of the coil 520*b* are disposed so as to match with each other in the circumferential direction. At this time, the circumferential width of the linear conductive portion 610 is equal to the circumferential width wc of the coil 520*b*.

On the other hand, since the coil 530*a* and the coil 510*a* have the same shape, as illustrated in FIG. 6A, the right end of the end portion cross-section 535*a* of the coil 530*a* and the right end of the end portion cross-section 543*b* of the coil 540*b* do not match with each other in the circumferential position. Even in this state, in order to suppress the contact resistance and the resistance variation of the coil connection portion, it is important to maintain the circumferential width of the linear conductive portion 630 equal to the circumferential width wc of the coil 540*b*.

Therefore, in the first embodiment of the present invention, as described below, regardless of the radial position in the slot, a dimensional condition has been newly found in which the circumferential width of the linear conductive portion is equal to the coil width wc in any coil connection portion.

First, the maximum value of wb can be defined as Expression (11) by using the dimensional relationship illustrated in FIG. 6B.

[Math 11]

$$w_b \le \frac{w_c}{\sin\beta} \quad (11)$$

The dimension of wb can be reduced by, for example, forming a shape like the detail of the portion A illustrated in FIG. 2B, and the dimension is maximum when the right end of the end portion cross-section 515*a* has an acute angle as illustrated in FIG. 6B.

Further, the circumferential distance θr between the first slot 100 and the second slot 200 illustrated in FIG. 6A can be defined as Expression (12).

[Math 12]

$$\theta_r = \frac{W/\tau_p \cdot m \cdot q}{P \cdot m \cdot q} \times 2\pi = \frac{W \cdot 2\pi}{\tau_p \cdot P} \quad (12)$$

In Expression (12), P is the number of poles, m is the number of phases, q is the number of slots per pole per phase, τp is a pole pitch, and W is a winding span.

The circumferential length wθ of the coil 510*a* of the first layer 110 illustrated in FIG. 6B is expressed by Expression (13) using the dimensional relationship illustrated in FIG. 6A.

[Math 13]

$$w_\theta = \theta_r \cdot (R_s - w_h) \lessapprox w_c \quad (1)$$

In Expression (13), Rs is a slot radius, wh is a coil thickness, and we is a coil width.

In the first embodiment of the present invention, since the circumferential lengths wθ1 and wθ3 of the coil 510*a* of the first layer 110 and the coil 530*a* of the third layer 130, respectively, are equal to each other, Expression (14) is established.

[Math 14]

$$w_{\theta 1} = w_{\theta 3} = w_\theta \quad (14)$$

In this case, in the second slot 200, in order to maintain the circumferential width of the linear conductive portion 630 equal to the circumferential width wc of the coil 540*b*, the left end of the end portion cross-section 535*a* of the coil 530*a* is only required to be located left of the left end of the end portion cross-section 543*b* of the coil 540*b*, and is only required to satisfy Expression (15).

[Math 15]

$$w_\theta - w_b \le \theta_r \times (R_s - 3w_h) \quad (15)$$

In Expression (15), the left side indicates the circumferential length from the left end of the coil 530*a* in the circumferential direction to the left end of the end portion cross-section 535*a*, and the right side indicates the circumferential length from the left end of the coil 530*a* in the circumferential direction to the left end of the end portion cross-section 543*b* of the coil 540*b*.

When the relationship of Expression (15) is satisfied, the end portion cross-section 540*b* is configured to fall within the range of the circumferential width wb of the end portion cross-section 535a, so that it is possible to maintain the circumferential width of the linear conductive portion 630 equal to the circumferential width wc of the coil 540b, and the suppression of the contact resistance and the suppression of the resistance variation in the coil connection portion can be realized.

When Expression (13) is substituted into Expression (15) and the case of the number of radial layers Nr is generalized, Expression (16) is obtained.

[Math 16]

$$\theta_r \cdot (R_s - w_h) + w_{dc} = w_b \leq \theta_r \cdot [R_s = (N_r - 1) \cdot w_h] \quad (16)$$

When Expression (16) is changed to Expression (17) with respect to wb.

[Math 17]

$$w_b \geq \theta_r \cdot (N_r - 2) \cdot w_h + w_c \quad (17)$$

From Expressions (11), (12), and (16), the dimensional condition under which the circumferential width of the linear conductive portion is equal to the coil width wc in any coil connection portion regardless of the radial position in the slot can be defined as Expression (18).

[Math 18]

$$\frac{W \cdot 2\pi}{\tau_p \cdot P} \cdot (N_r - 2) \cdot w_h + w_c \leq w_b \leq \frac{w_c}{\sin\beta} \quad (18)$$

As a result, since the same type of coil can be used in a plurality of layers while the suppression of the contact resistance and the suppression of the resistance variation in the coil connection portion are realized, it is not necessary to change the circumferential length of the coil for respective layers, and the problem of an increase in the number of components can be solved.

Subsequently, in the following, an optimum condition of the coil cross-section aspect ratio wh/wc (ratio between coil thickness and coil width) is newly found for the purpose of improving the degree of freedom in design.

First, in Expression (18), Expression (19) is obtained by dividing each side by the coil width wc.

[Math 19]

$$\frac{W \cdot 2\pi}{\tau_p \cdot P} \cdot (N_r - 2) \cdot \frac{w_h}{w_c} + 1 \leq \frac{w_b}{w_c} \leq \frac{1}{\sin\beta} \quad (19)$$

From Expressions (6), (8), and (10) and FIG. 5B, in the first embodiment of the present invention, when the ratio rw of the tooth width wt to the slot width ws takes the upper limit value (rw=10), β takes the minimum value (β=0.091 rad=5.2 deg.).

At this time, the right side 1/sinβ of Expression (19) is the maximum value of 11. Therefore, Expression (20) is established for the left side of Expression (19).

[Math 20]

$$\frac{W \cdot 2\pi}{\tau_p \cdot P} \cdot (N_r - 2) \cdot \frac{w_h}{w_c} + 1 < 11 \quad (20)$$

Expression (21) is obtained by disposing Expression (20) with respect to the number of radial layers Nr.

[Math 21]

$$N_r < \frac{10 \cdot P}{W/\tau_p \cdot 2\pi} \cdot \frac{1}{w_h/w_c} + 2 \quad (21)$$

As can be seen from Expression (21), the upper limit value of the number of radial layers Nr is a function of the number of poles P and the coil cross-section aspect ratio wh/wc. FIG. 7 is a graph illustrating a relationship between the number of radial layers Nr and wh/wc for any number of poles P. FIG. 7 illustrates a case where the number of poles P is 2, 4, 8, 16, 32, or 64 as a representative example.

FIG. 7 illustrates that for any number of poles P, the number of radial layers Nr smaller than a value of the illustrated curve can be selected as a design value. That is, it can be seen that the selectable range of Nr decreases as the aspect ratio wh/wc increases.

In addition, it can be seen that the range of selectable Nr decreases as the number of poles P decreases.

Generally, in motor design, adjustment of the number of radial layers Nr is important in order to meet various customer needs (here, in particular, voltage and current specifications). Therefore, it is desirable to set the upper limit value of the number of radial layers Nr to a high level to increase the degree of freedom in design.

Referring to FIG. 7 from this viewpoint, in the range of the aspect ratio wh/wc>1, the number of radial layers Nr substantially converges to the lower limit value, and the degree of freedom in design is low.

From the above, in the first embodiment of the present invention, a condition represented by Expression (22) was found as a dimensional condition under which the degree of freedom in design can be improved.

[Math 22]

$$0 < \frac{w_h}{w_c} \leq 1 \quad (22)$$

The coil appearance in the first embodiment of the present invention will be described at the end of the first embodiment with reference to FIG. 8.

FIG. 8 is a diagram illustrating a plurality of segment coils inserted into a plurality of slots (not illustrated) disposed in the circumferential direction.

In FIG. 8, each slot has four layers aligned in the radial direction. At the I end, the second region portion 512 of the first segment coil 510 appears in the first layer, the first region portion 521 of the second segment coil 520 appears in the second layer, the second region portion 532 of the third segment coil 530 appears in the third layer, and the first region portion 541 of the fourth segment coil 540 appears in the fourth layer. On the other hand, at the II end, the first region portion 511 of the first segment coil 510 appears in the first layer, the second region portion 522 of the second segment coil 520 appears in the second layer, the first region portion 531 of the third segment coil 530 appears in the third layer, and the second region portion 542 of the fourth segment coil 540 appears in the fourth layer.

As described above, in the configuration of the first embodiment of the present invention, the coil does not move to different layers. In addition, there is no process such as a bending process after the coil is inserted into the slot. Therefore, the coil assembly work can be performed very easily.

That is, according to the first embodiment of the present invention, it is possible to realize a rotating electric machine having high efficiency and high reliability without causing an increase in size and cost and a method for manufacturing the rotating electric machine.

At least two of the plurality of rectangular wire segment coils 510, 520, 530, and 540 disposed in the plurality of layers 110 to 140, respectively, can be configured to have the same shape.

Second Embodiment

Next, the second embodiment of the present invention will be described with reference to FIGS. 9A and 9B.

Figure 9A:
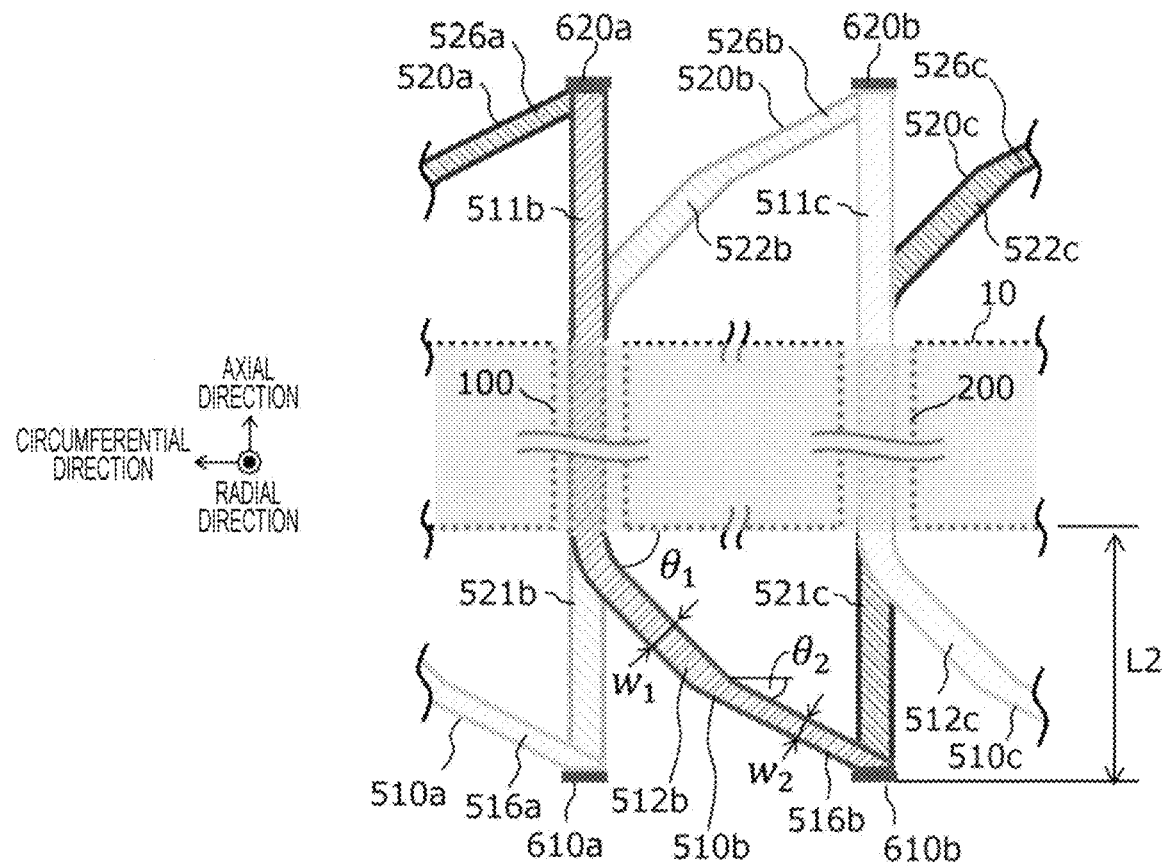
FIG. 9A is an explanatory diagram of a coil shape in the second embodiment of the present invention.
Figure 9B:
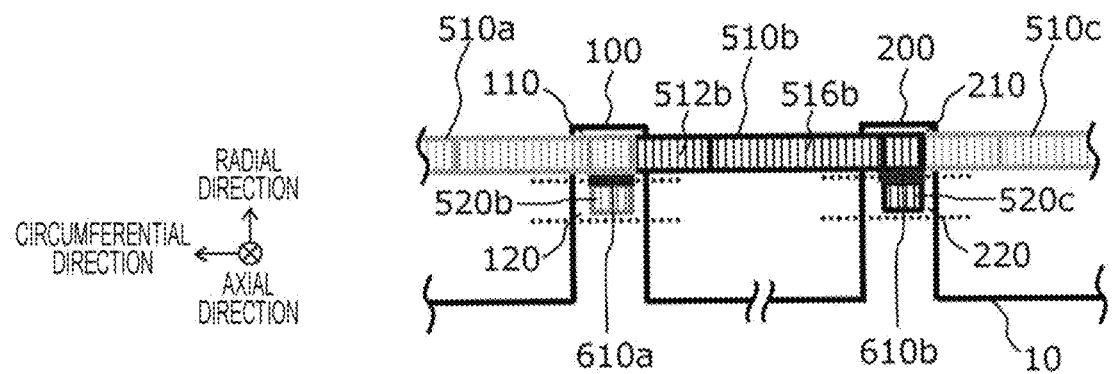
FIG. 9B is an explanatory diagram of a coil shape in the second embodiment of the present invention.

FIGS. 9A and 9B are explanatory diagrams of a coil shape in the second embodiment of the present invention, and a difference from the first embodiment is a shape of a coil end, and is diagrams corresponding to FIGS. 3B and 3C illustrating the first embodiment.

Focusing on the coil 510b in FIGS. 9A and 9B, the second region portion 512b includes the third region portion 516b whose thickness decreases along a direction away from the stator core 10 in the axial direction. When the coil width of the second region portion 512b is represented by w1 and the inclination angle with respect to the axial end face of the stator core is represented by θ1, the coil width w2 and the inclination angle θ2 of the third region portion 516b satisfy Expressions (23) and (24), respectively.

[Math 23]
$$w1 > w2 \quad (23)$$

[Math 24]
$$\theta 1 > \theta 2 \quad (24)$$

The other coils have the same configuration.

With such a configuration, the axial length of the coil end can be reduced, and L2 illustrated in FIG. 9A is smaller than L1 illustrated in FIG. 3B.

As a method of processing the third region portion 516b, the coil element wire may be molded by extrusion molding or drawing, or only the relevant portion may be cut so as to have a width of w2. Further, in FIG. 9, a corner bent portion is provided between the second region portion 512b and the third region portion 516b, but the smooth bend on an arc may be configured. In addition, two or more bent portions may be provided for one segment coil.

According to the second embodiment, the effects same as those of the first embodiment can be obtained, and the axial length of the coil end can be reduced.

In FIG. 9A, the third region portion 516a, the third region portion 516c, the third region portion 526a, the third region portion 526b, and the third region portion 526c have the same shape as the third region portion 516b.

Third Embodiment

Figure 10:
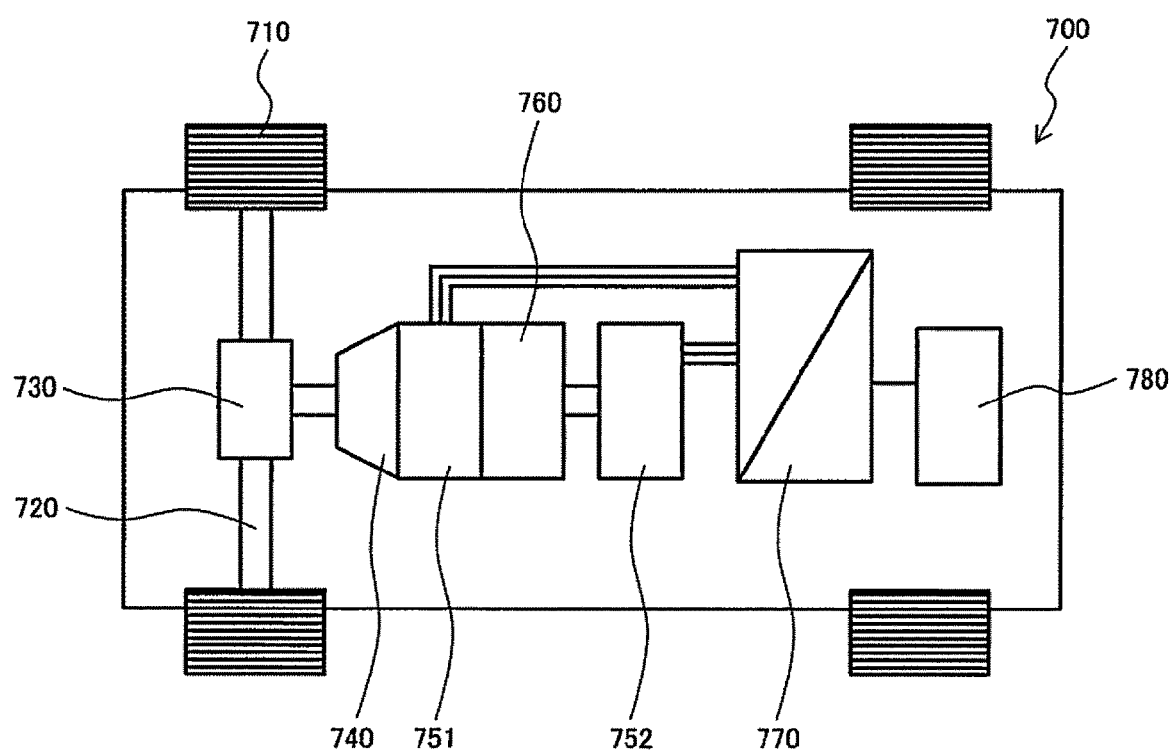
FIG. 10 an explanatory diagram of a vehicle according to the third embodiment of the present invention to which the present invention is applied.

Next, the third embodiment of the present invention will be described with reference to FIG. 10. FIG. 10 is an explanatory diagram of a vehicle 700 according to the third embodiment of the present invention.

The first embodiment or the second embodiment of the present invention is applied to rotating electric machines 751 and 752 illustrated in FIG. 10. The vehicle 700 refers to, for example, a hybrid vehicle or a plug-in hybrid vehicle, and includes an engine 760, the rotating electric machines 751 and 752, and a battery 780.

When the rotating electric machines 751 and 752 are driven, the battery 780 supplies DC power to a driving power conversion device 770 (inverter device). The power conversion device 770 converts DC power from the battery 780 into AC power, and supplies the AC power to the rotating electric machines 751 and 752.

Further, during regenerative traveling, the rotating electric machines 751 and 752 generate AC power according to kinetic energy of the vehicle 700 and supply the AC power to the power conversion device 770. The power conversion device 770 converts AC power from the rotating electric machines 751 and 752 into DC power, and supplies the DC power to the battery 780.

The rotational torque generated by the engine 760 and the rotating electric machines 751 and 752 is transmitted to the wheels 710 via a transmission 740, a differential gear 730, and an axle 720.

Generally, an automobile is required to have a wide driving range such as a large torque at a low speed when starting at a slope, a low torque at a high speed on a highway, and a medium torque at a medium speed when riding in a town. In such a wide driving range, the rotating electric machines 751 and 752 can be operated with high efficiency. In addition, since the heat loss is reduced, it is possible to improve the safety of the vehicle 700 and extend the life of the vehicle. In addition, the cruising distance of the vehicle 700 can be extended.

Even in an electric vehicle, which does not include the engine 760 and is driven only by the power of the rotating electric machines 751 and 752, the same effect can be obtained by applying the rotating electric machine according to the first embodiment or the second embodiment of the present invention.

REFERENCE SIGNS LIST 10 stator core
20 stator tooth
100 first slot
110 first layer
120 second layer
130 third layer
140 fourth layer
200 second slot
400 inter-layer gap
510 first segment coil
511 first region portion
512 second region portion
512d bent portion
513 end portion cross-section
514 vertical cross-section
515 end portion cross-section
516b third region portion
520 second segment coil
521 first region portion
522 second region portion
523 end portion cross-section
525 end portion cross-section
526a third region portion
530 third segment coil
531 first region portion
532 second region portion
535 end portion cross-section
540 fourth segment coil
541 first region portion
542 second region portion
543 end portion cross-section
610, 630 linear conductive portion
620 planar conductive portion 700 vehicle
710 wheel
720 axle
730 differential gear
740 transmission
751, 752 rotating electric machine
760 engine
770 power conversion device
780 battery

The invention claimed is:

1. A rotating electric machine comprising:
a plurality of rectangular wire segment coils; and
a stator core having a slot that houses the plurality of rectangular wire segment coils,
wherein the slot has a plurality of layers disposed in a radial direction of the rotating electric machine,
wherein each of the plurality of rectangular wire segment coils has an insertion portion disposed in the slot, and has a first region portion linearly formed along an axial direction of the rotating electric machine and a second region portion connected to the first region portion and formed along a circumferential direction including a bent portion in the circumferential direction of the stator core,
wherein the second region portion includes a third region portion in which a coil width decreases along a direction away from the stator core in the axial direction of the rotating electric machine,
wherein a pair of the rectangular wire segment coils adjacent to each other at coil ends of the plurality of rectangular wire segment coils includes a conductive portion to which the first region portion of one of the rectangular wire segment coils and the second region portion of the other of the rectangular wire segment coils are connected,
wherein in the conductive portion, the second region portion has a conductive portion cross-section disposed on a same plane as an end portion cross-section of the first region portion, and the conductive portion cross-section is a cross-section in a direction different from a direction of a coil vertical cross-section of the second region portion, and
wherein each of the plurality of layers includes a first layer in which the first region portion appears at an axial end portion and a second layer in which the second region portion appears at an axial end portion when the coil end is viewed in an axial direction of the rotating electric machine.

2. The rotating electric machine according to claim 1, wherein
when the coil end is viewed in an axial direction of the rotating electric machine, the conductive portion is formed by a welding line extending in a circumferential direction of the rotating electric machine and contact between a radial face of the second region portion and a radial face of the first region portion, or formed by the welding line or contact between the radial face of the second region portion and the radial face of the first region portion.

3. The rotating electric machine according to claim 1, wherein
in the conductive portion, an end portion cross-section of the first region portion has a circumferential width of wc, and wc<wa, where wa is a length obtained by adding wc to a circumferential width of an end portion cross-section of the second region portion and subtracting a circumferential width of a portion where the end portion cross-section of the first region portion and the end portion cross-section of the second region portion overlap with each other in a radial direction, or an end portion cross-section of the second region portion has a circumferential width of wb, and wc<wb, or wc<wa and wc<wb.

4. The rotating electric machine according to claim 1, wherein
at least two of the plurality of rectangular wire segment coils disposed in the plurality of layers have a same shape.

5. The rotating electric machine according to claim 1,
wherein the stator core includes a plurality of stator teeth disposed in a circumferential direction of the rotating electric machine,
wherein the stator tooth has a circumferential width wt, wherein the slot has a circumferential width ws, and
wherein a following relationship holds between the circumferential width wt and the circumferential width ws:

$0.5 \leq (wt/ws) \leq 10$.

6. The rotating electric machine according to claim 1,
wherein in the rotating electric machine, an end portion cross-section of the second region portion has a circumferential width of wb, and
wherein a following relationship holds between wb and wc: $(W \cdot 2\pi)/(\tau p \cdot P) \cdot (Nr-2) \cdot wh + wc \leq wb \leq wc/\sin\beta$
where P is the number of poles, $\tau p$ is a pole pitch, W is a winding span, Nr is the number of radial layers, wh is a coil thickness, wc is a coil width, and $\beta$ is a coil inclination angle with respect to an axial end face of the stator core.

7. The rotating electric machine according to claim 6, wherein the number of radial layers Nr satisfies a following relationship:

$Nr < ((10 \cdot P)/((W/\tau p) - 2\pi)) \cdot (1/(wh/wc)) + 2$.

8. The rotating electric machine according to claim 1, wherein
in the rotating electric machine, a following relationship holds between wh and wc:

$0 < (wh/wc) \leq 1$ where wh is a coil thickness and wc is a coil width.

9. The rotating electric machine according to claim 1,
wherein the second region portion is inclined by an inclination angle $\theta 1$ with respect to an axial end face of the stator core,
wherein the third region portion is inclined by an inclination angle $\theta 2$ with respect to the axial end face of the stator core, and
wherein the inclination angle $\theta 1$ and the inclination angle $\theta 2$ satisfy a relationship:
inclination angle $\theta 1$ > inclination angle $\theta 2$.

10. The rotating electric machine according to claim 1, further comprising:
a battery; and
a power conversion device that converts DC power of the battery into AC power and supplies the AC power to the rotating electric machine,
wherein the rotating electric machine is used for the rotating electric machine of a vehicle in which torque of the rotating electric machine is transmitted to wheels via a transmission.

11. A method of manufacturing a rotating electric machine including a plurality of rectangular wire segment coils and a stator core having a slot that houses the plurality of rectangular wire segment coils,
    wherein the slot has a plurality of layers disposed in a radial direction of the rotating electric machine, the method comprising:
    each of the plurality of rectangular wire segment coils having an insertion portion disposed in the slot, and
    forming a first region portion linearly along an axial direction of the rotating electric machine and forming a second region portion connected to the first region portion and along a circumferential direction including a bent portion in the circumferential direction of the stator core,
    wherein the second region portion includes a third region portion in which a coil width decreases along a direction away from the stator core in the axial direction of the rotating electric machine,
    wherein a pair of the rectangular wire segment coils adjacent to each other at coil ends of the plurality of rectangular wire segment coils includes a conductive portion to which the first region portion of one of the rectangular wire segment coils and the second region portion of the other of the rectangular wire segment coils are connected,
    wherein in the conductive portion, the second region portion has a conductive portion cross-section disposed on a same plane as an end portion cross-section of the first region portion, and the conductive portion cross-section is a cross-section in a direction different from a direction of a coil vertical cross-section of the second region portion, and
    wherein each of the plurality of layers includes a first layer in which the first region portion appears at an axial end portion and a second layer in which the second region portion appears at an axial end portion when the coil end is viewed in an axial direction of the rotating electric machine.

\* \* \* \* \*